United States Patent
Shaffer et al.

(10) Patent No.: US 7,551,603 B1
(45) Date of Patent: *Jun. 23, 2009

(54) TIME-SENSITIVE-PACKET JITTER AND LATENCY MINIMIZATION ON A SHARED DATA LINK

(75) Inventors: Shmuel Shaffer, Palo Alto, CA (US);
Joseph F. Khouri, San Jose, CA (US);
Michael E. Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 901 days.

This patent is subject to a terminal disclaimer.

(21) Appl. No.: 10/765,421

(22) Filed: Jan. 27, 2004

Related U.S. Application Data

(63) Continuation of application No. 09/614,536, filed on Jul. 11, 2000, now Pat. No. 6,707,821.

(51) Int. Cl.
*H04L 12/26* (2006.01)
*H04J 3/14* (2006.01)
*G08C 15/00* (2006.01)
*G06F 11/00* (2006.01)
*G01R 31/08* (2006.01)

(52) U.S. Cl. .................. 370/352; 370/252; 370/412; 370/444; 709/251

(58) Field of Classification Search ......... 370/347–412, 370/428–473, 516–529, 229–237; 709/224–253
See application file for complete search history.

(56) References Cited

U.S. PATENT DOCUMENTS

| | | | | |
|---|---|---|---|---|
| 5,121,385 A * | 6/1992 | Tominaga et al. | ............ | 370/435 |
| 5,935,218 A * | 8/1999 | Beyda et al. | ................ | 709/251 |
| 6,172,984 B1 * | 1/2001 | Beyda et al. | ................ | 370/448 |
| 6,215,791 B1 * | 4/2001 | Kim | ........................... | 370/412 |
| 6,236,672 B1 * | 5/2001 | Hiramatsu | ................... | 375/141 |
| 6,249,757 B1 * | 6/2001 | Cason | ........................ | 704/214 |
| 6,320,879 B1 * | 11/2001 | Bremer | ....................... | 370/493 |
| 6,393,000 B1 * | 5/2002 | Feldman | ..................... | 370/316 |
| 6,477,176 B1 * | 11/2002 | Hamalainen et al. | ........ | 370/435 |
| 6,529,499 B1 * | 3/2003 | Doshi et al. | .................. | 370/352 |
| 6,535,567 B1 * | 3/2003 | Girardeau, Jr. | .............. | 375/372 |
| 6,560,230 B1 * | 5/2003 | Li et al. | .................. | 370/395.42 |
| 6,580,694 B1 * | 6/2003 | Baker | ........................ | 370/252 |
| 6,707,821 B1 * | 3/2004 | Shaffer et al. | ............ | 370/395.4 |
| 6,910,133 B1 * | 6/2005 | Cohn | .......................... | 713/190 |
| 6,940,826 B1 * | 9/2005 | Simard et al. | ............... | 370/260 |
| 6,977,905 B1 * | 12/2005 | Shaffer et al. | ................ | 370/252 |
| 7,161,905 B1 * | 1/2007 | Hahn et al. | .................. | 370/231 |
| 7,230,952 B2 * | 6/2007 | Beshai | ........................ | 370/412 |
| 2002/0039371 A1 * | 4/2002 | Hedayat et al. | .............. | 370/516 |
| 2004/0194142 A1 * | 9/2004 | Jiang et al. | .................... | 725/96 |

* cited by examiner

*Primary Examiner*—Man Phan
(74) *Attorney, Agent, or Firm*—Stolowitz Ford Cowger LLP

(57) ABSTRACT

A system and method are disclosed for interleaving time-critical packets and lower-priority packets onto a common data link. A packet arrival prediction mechanism predicts when a time-critical packet is expected to arrive. When transmission of a waiting lower-priority packet might cause a substantial delay in the expected time-critical packet's transmission, the lower-priority packet is parked until it can be transmitted without interfering with a time-critical packet.

29 Claims, 14 Drawing Sheets

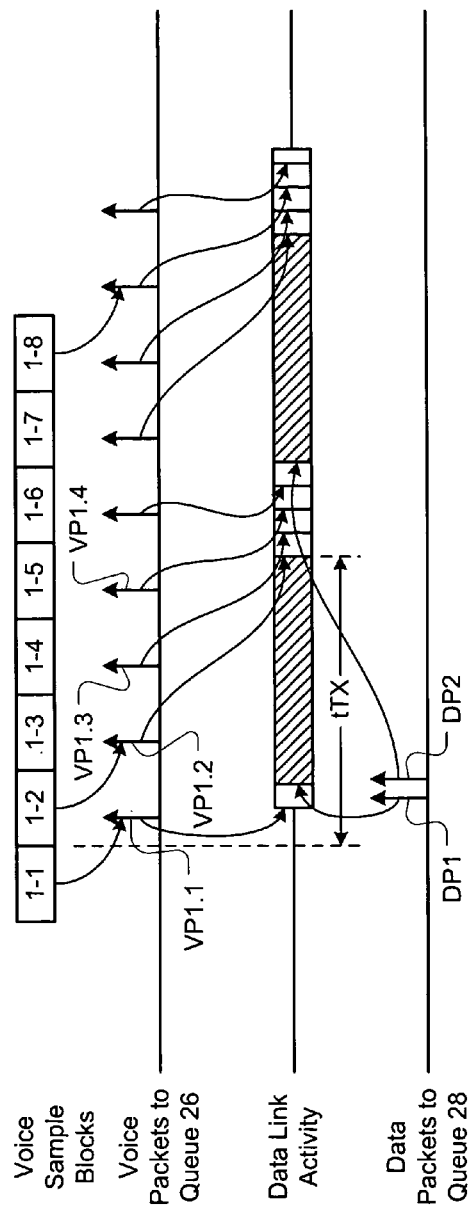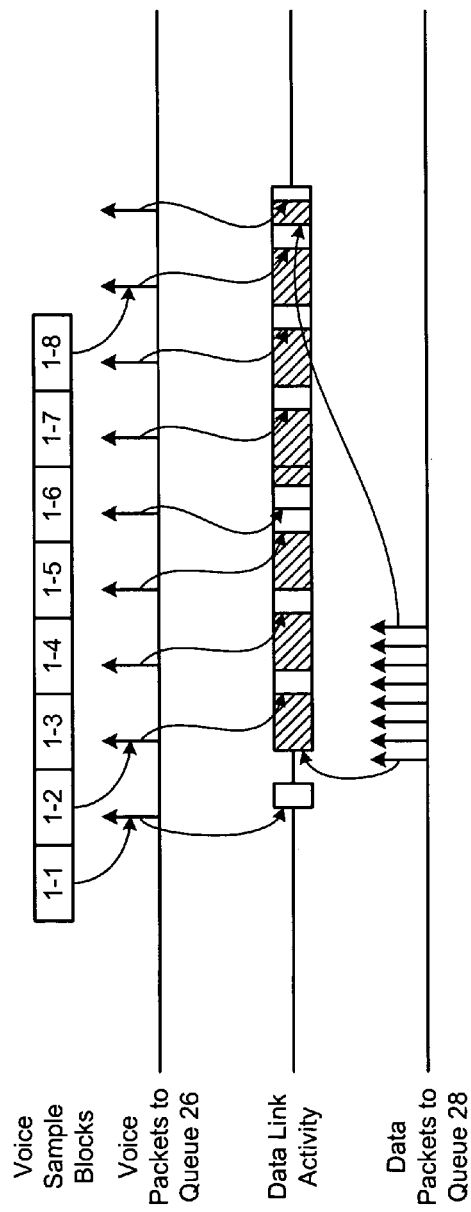

TIME-SENSITIVE-PACKET JITTER AND LATENCY MINIMIZATION ON A SHARED DATA LINK

This application is a continuation of prior U.S. Ser. No. 09/614,536, filed Jul. 11, 2000 now U.S. Pat. No. 6,707,821.

FIELD OF THE INVENTION

This present invention relates generally to voice-over-packet-network and similar time-critical packet transmission, and more particularly to systems and methods for interleaving time-critical packets with lower-priority packets on a common data link without inducing significant jitter and/or delay in the time-critical packets.

BACKGROUND OF THE INVENTION

Packet-switched networks route data from a source to a destination in packets. A packet is a relatively small sequence of digital symbols (e.g., several tens of binary octets up to several thousands of binary octets) that contains a payload and one or more headers. The payload is the information which the source wishes to send to the destination. The headers contain information about the nature of the payload and its delivery. For instance, headers can contain a source address, a destination address, data length and data format information, data sequencing or timing information, flow control information, and error correction information.

A packet's payload can consist of just about anything that can be conveyed as digital information. Some examples are e-mail, computer text, graphic, and program files, web browser commands and pages, and communication control and signaling packets. Other examples are streaming audio and video packets, including real-time bidirectional audio and/or video conferencing. In Internet Protocol (IP) networks, a two-way (or multipoint) audio conference that uses packet delivery of audio is usually referred to as Voice over IP, or VoIP.

The urgency with which a given packet should be delivered depends to a great extent on the type of payload. E-mail and background file transfers are among the least urgent, as delays of minutes can usually easily be tolerated. On the other end of the spectrum, VoIP packets typically must be delivered within a few hundred milliseconds of their creation, or VoIP call quality begins to degrade noticeably. Other relatively high-priority packets can include data link flow control packets and network node status packets.

Since high-priority packets and low-priority packets must share the packet network, various schemes have been proposed to provide fair allocation of network resources between the two. For instance, FIG. 1 illustrates a portion of a device 20, e.g., implemented on a computer, that multiplexes VoIP packets and other data packets onto a common data link using a priority queuing mechanism. The VoIP packets are created by digitally encoding a voice capture channel (e.g., from a microphone or headset) using an A/D (analog-to-digital) converter 22 and a voice encoder 26. Data packets are received from other applications running on the computer, e.g., a web-browser, e-mail application, or networked file system application.

Device 20 uses two packet queues. A time-critical-packet queue 28 queues VoIP packets as they are created. A data packet queue 36 queues lower-priority packets. Note that in FIG. 1, data packets pass through an optional data packet fragmenter 34, which segments large data packets into sequences of smaller data packets before submission to queue 36. Note also that signal packets from controller 24 are submitted to data packet queue 36. The signal packets provide overall coordination of VoIP call setup and termination, among other things, and may optionally be placed in queue 28.

Packet scheduler 30 multiplexes packets from queues 28 and 36 to data link interface 32. Under one prior art method of operation, scheduler 30 selects time-critical packets from queue 28 until queue 28 is emptied. When queue 28 is empty, scheduler 30 then selects packets from data packet queue 36. When queue 28 receives one or more additional time-critical packets, scheduler 30 switches back to queue 28 until that queue is once again empty.

The priority operation of scheduler 30 can be better understood with reference to the timing diagrams of FIGS. 2, 3, and 4. Referring first to FIG. 2, a single talkspurt on the voice capture channel is represented. The overall duration of the talkspurt is tTS1.

Voice encoder 26 groups voice samples from A/D converter 22 into voice sample blocks 1-1, 1-2, . . . , 1-8. Each sample block represents the same fixed number of voice samples, e.g., 80 samples, 240 samples, etc. Because the number of samples is fixed, block 1-8 extends past the end of the talkspurt in order to take in the appropriate number of samples.

Voice encoder 26 encodes each sample block into a voice packet. Simple encoders may do no more than place the entire sample block in a packet payload and attach addressing headers. More sophisticated encoders may compress the sample block using a variety of known coding techniques. In either case, the encoder cannot place a voice packet in packet queue 28 until sometime after the entire sample block is received at encoder 26—if sophisticated coding must also take place, additional delay may occur while the data is compressed. FIG. 2 illustrates the packet formation delay, tPF, as the time between when the first sample of a sample block is generated and when the packet corresponding to that sample block is queued.

When the time-critical packets do not have to compete for data link bandwidth (and the bandwidth of the channel is large compared to packet size), total packet transmission delay is not much greater than packet formation delay. Packet transmission delay, tTX, is the time between when the first sample of a sample block is generated and when transmission of the packet corresponding to that sample block has completed.

It is believed to have been heretofore unrecognized that time-critical packet transmission can be negatively affected, even with priority queuing. FIG. 3 shows packet transmission delay when two data packets are placed in data queue 28 shortly after voice packet VP1.1 is placed in queue 26. Once VP1.1 has been placed on the data link, queue 26 is empty. Scheduler 30 thus checks queue 36, finds data packet DP1 waiting, and selects that data packet for transmission. While the data packet is transmitting, voice packets VP1.2, VP1.3, and VP1.4 arrive at queue 26. Thus, a four-packet delayed "burst" of voice packets occurs at the end of data packet DP1 transmission. With queue 26 once again empty, data packet DP2 from queue 36 is selected for transmission, causing another four-packet burst of voice packets to occur. In addition to the voice sample "bursting" phenomenon, data packet transmission has caused the transmission delay tTX for voice sample block 1-2, for example, to be substantially longer than the comparable delay in FIG. 2.

FIG. 4 shows the same scenario as FIG. 3, but using data packet fragmenter 34 to segment the two data packets of FIG. 3 into eight smaller data packets. Although this tends to improve the regularity of voice packet transmission and lessen the average voice packet transmission delay, the problem is not completely cured.

SUMMARY OF THE INVENTION

The disclosed embodiments address the interleaving of time-critical packets, such as VoIP packets, with lower-priority packets on a common data link. It has now been recognized that priority queuing can cause the time-critical packet jitter and absolute latency problems shown in FIG. 3—particularly on low-speed data links where the transmit time for a maximum transmission unit (MTU) data packet is on the order of (or larger than) the time spacing between consecutive voice packets. Furthermore, is has also now been recognized that an approach different from data packet fragmentation is also desirable. Not only does fragmentation not completely diminish the negative effects of priority queuing, but data packet fragmentation is generally undesirable, often difficult, and sometimes impossible to achieve.

In general, the disclosed embodiments determine when lower-priority packets can be sent with a low probability of introducing jitter or latency in a time-sensitive packet data stream. The embodiments take advantage of several characteristics of time-sensitive packet data. One, most packet voice and/or video systems generate packets at a fairly predictable maximum rate. Second, many such systems decrease their rate substantially when the voice or video is highly compressible—i.e., during silent intervals or speech pauses (voice) and during periods of low motion content (video). The disclosed embodiments leverage these characteristics to predict the best times for interleaving data packets with voice or video packet streams.

In one aspect of the invention, a method of interleaving time-critical packets with lower-priority packets on a common data link is disclosed. Time-critical-packet arrival statistics are maintained. Then, when a lower-priority packet becomes available for transmission across the data link, the transmit time required for transmission of that packet is estimated. Based on the time-critical packet arrival statistics and the estimated transmit time for the lower-priority packet, a prediction is made. The prediction assesses whether the lower-priority packet can be submitted for transmission across the data link without causing substantial delay to a time-critical packet that is not yet available for transmission across the data link. When transmission at the current time is deemed acceptable, the lower-priority packet is supplied to the data link; otherwise, the lower-priority packet is parked, and the predicting step is performed again at a later time.

In another aspect of the invention, a packet data transmitting device is disclosed. The device comprises a data link interface, a lower-priority-packet queue to queue lower-priority packets awaiting submission to the data link interface, and a time-critical-packet queue to queue time-critical packets awaiting submission to the data link interface. The device further comprises a time-critical-packet arrival prediction mechanism to provide a prediction of the next time-critical packet's arrival time, and a packet transmit time estimator to provide an estimate of a packet's transmit time. The device also comprises a packet scheduler to interleave submission, to the data link interface, of the lower-priority packets and the time-critical packets. The scheduler receives predictions from the time-critical-packet arrival prediction mechanism and transmit time estimates from the packet transmit time estimator. The scheduler selects a packet from the lower-priority-packet queue for submission to the data link interface when that packet's transmission can be completed without causing substantial delay to a time-critical-packet that is not yet in the time-critical-packet queue.

BRIEF DESCRIPTION OF THE DRAWING

The invention may be best understood by reading the disclosure with reference to the drawing, wherein:

FIGS. 2, 3, and 4 contain timing diagrams for operation of the device of FIG. 1;

DETAILED DESCRIPTION

Before introducing the described embodiments, several terms require definition. As used herein, a data link interface is a mechanism, typically but not necessarily found at the data link layer, that provides packet data access between higher communication layers and a physical data link. A time-critical packet is a packet that carries information which loses most (or all) of its value if the packet is held up for more than a few seconds. Some examples of time-critical packets are VoIP, video conferencing, interactive network gaming packets, and data flow control packets. Of course, a user may define any type of data traffic they desire as time-critical also. A lower-priority packet is any packet that is not designated as time-critical. Thus, although it may be annoying to some people to wait five seconds for a web page or a list of remotely-available files to be displayed, most people will tolerate the wait and value the information as much, or nearly so, as they would have if it were available instantaneously—it is likely that such information is not time-critical. A substantial delay is the tolerable packet delay defined for a particular operating scenario—this need not be a constant. For instance, while a speaker is talking, one level of delay may be tolerable, but after the speaker has been silent for a time period, a higher initial delay may be tolerable when speech is resumed.

The detailed embodiments are discussed with reference to VoIP voice packets as the time-critical packets, in order that the invention can be clearly presented. Following the detailed embodiments, general notes on application of the concepts described herein to other types of time-critical data are presented.

Figure 1:
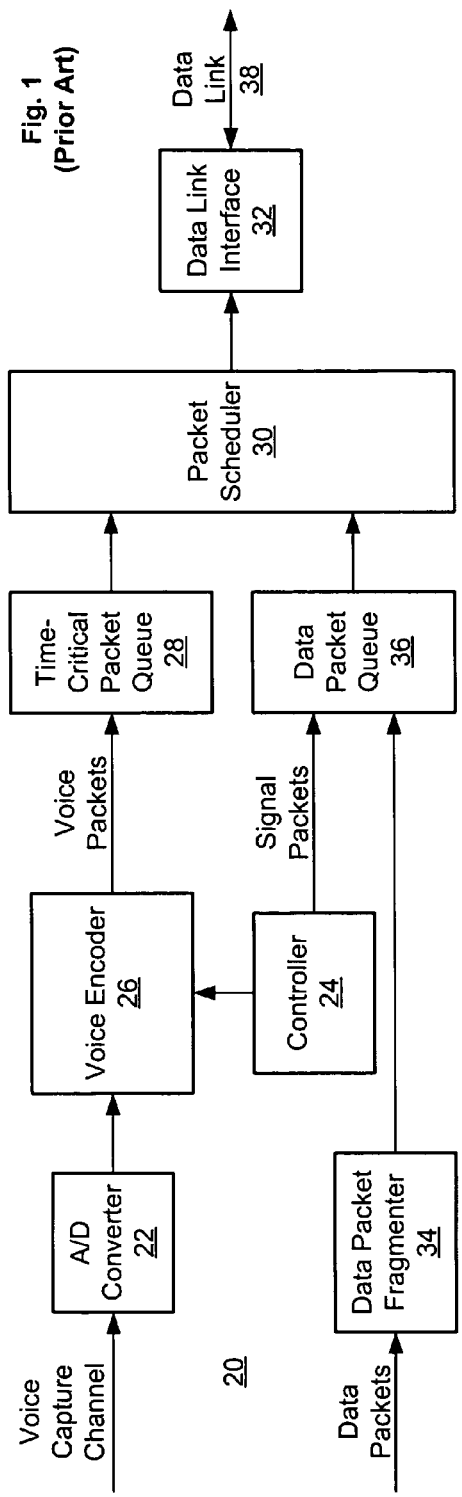
FIG. 1 illustrates a prior art device for interleaving time-critical packets and lower-priority packets on a common data link.
Figure 2:
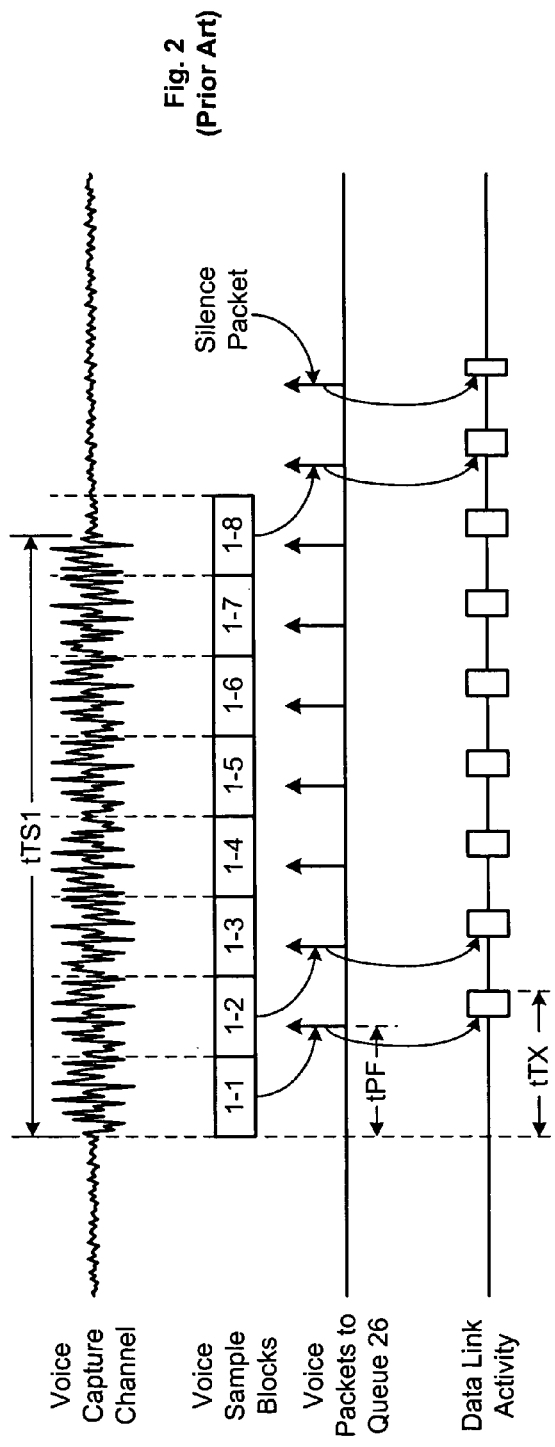
Figure 5:
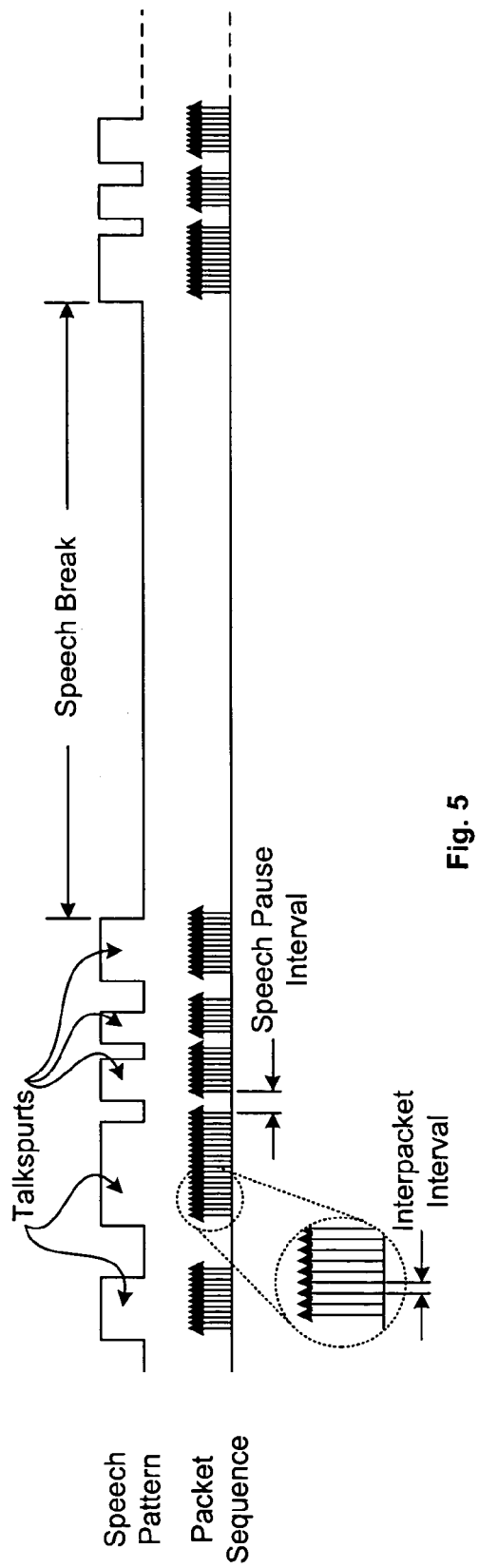
FIG. 5 illustrates, in a timing diagram format, some terminology used in the detailed description.

FIG. 5 illustrates some additional terminology that will be used in the following description. Within a typical speech pattern, voice energy is concentrated in talkspurts. Each talkspurt may represent one syllable, word, or phrase, punctuated by the speaker's natural speech pauses. The speech pattern will typically also contain speech breaks, much longer than the speech pauses. The speech breaks occur, e.g., while the caller is gathering their thoughts, or while the caller is listening to the person on the other end of the line speak.

Packet sequence patterns generally follow speech patterns when silence suppression is used. Thus during a speech break, no packets (or intermittent comfort-noise packets) will be transmitted. During a speech pause, no packets will be transmitted. Furthermore, during a talkspurt, an interpacket interval will exist between consecutive voice packets on the data link (unless the voice packet data rate consumes the entire data link bandwidth).

Figure 6:
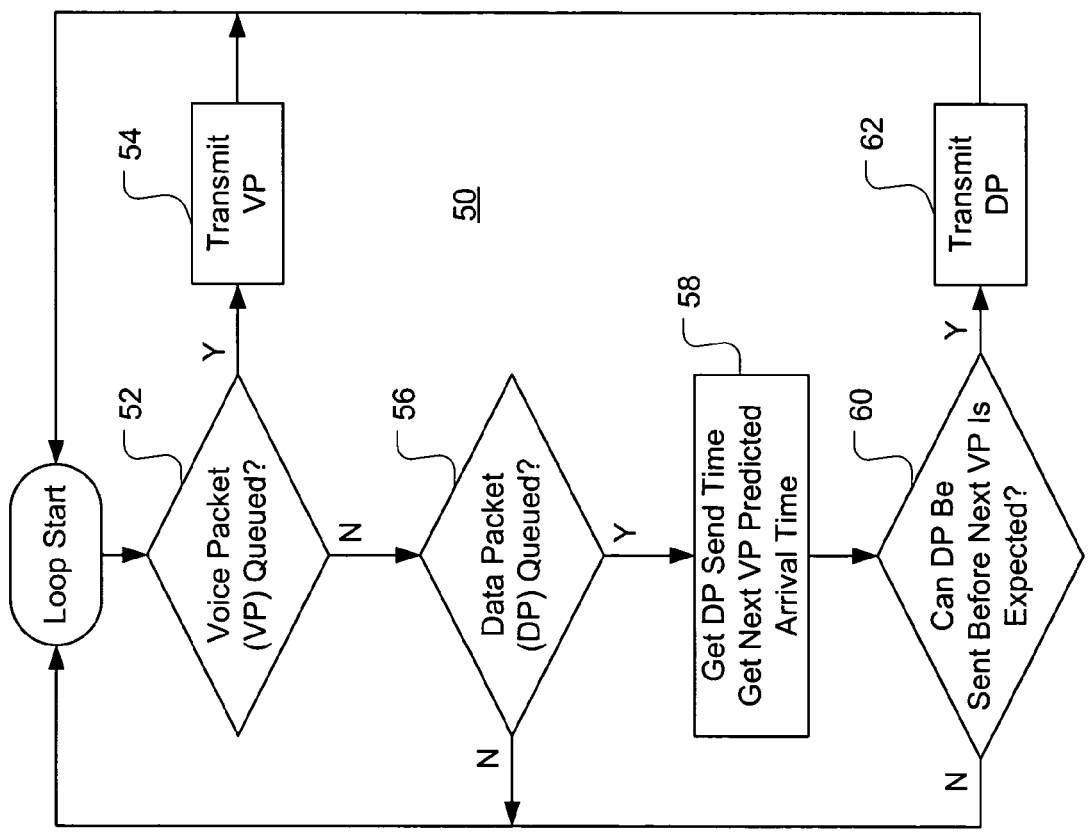
FIG. 6 depicts a high-level flowchart for a packet interleaving operation according to an embodiment of the invention.

As an introduction to the embodiments, FIG. 6 presents a high-level flowchart 50 for operation of an embodiment of the invention. It is assumed in FIG. 6 that the device uses a voice packet (VP) queue and a data packet (DP) queue. At decision block 52, if a VP is queued, control is transferred to block 54 and the VP is transmitted. If no VP is queued, control is transferred to decision block 56. Decision block 56 determines if a DP is currently queued. If no DP is queued, control is passed back to the loop start, which may be triggered again by a timer or by a queue event, or just loop continuously.

When a DP is queued, block 58 gets two values. The "DSend Time" is the estimated transmit time that the DP will require. The "Next VP Predicted Arrival Time" is the time when the next packet is expected in the VP queue.

Block 60 uses the results of block 58 to decide whether or not to send DP. In essence, block 60 answers the question "can DP be sent before the next VP is expected?" If the answer is yes, block 62 transmits DP. If the answer is no, DP is parked in the DP queue and control is passed back to the loop start.

Figure 7:
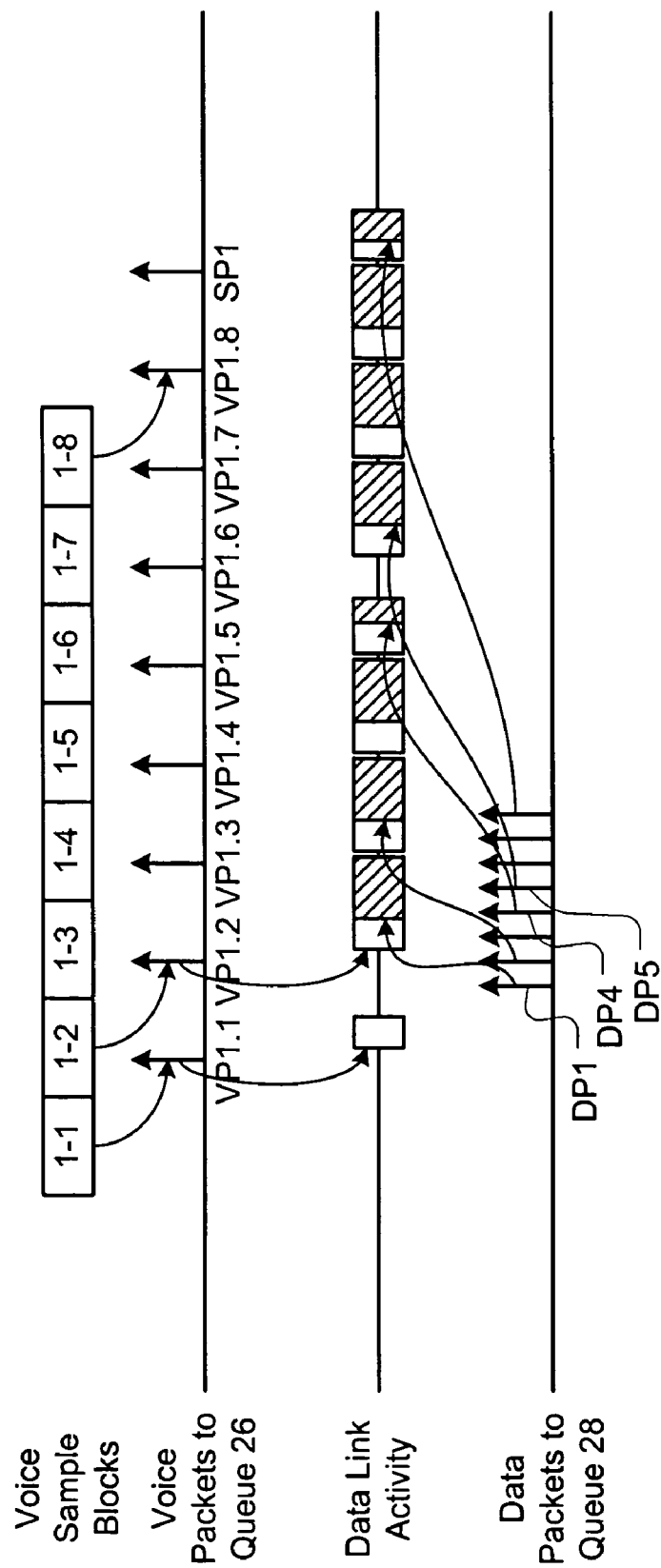
FIGS. 7, 8, and 9 contain timing diagrams for packet interleaving operations according to embodiments of the invention.

FIG. 7 shows the same VP and DP queuing sequence as FIG. 4, but with data link packet ordering according to an embodiment of the invention. Before VP1.2 enters queue 26, DPs begin to arrive in queue 28. But DP1 is parked, because its transmit time exceeds the time remaining until VP1.2 is expected.

After VP1.2 is transmitted, the time remaining until VP1.3 is expected exceeds the expected transmit time for DP1. Thus DP1 is transmitted between VP1.2 and VP1.3. Because each successive DP fits between two of the VPs, this interleaving continues throughout the talkspurt. Note that before VP1.6 is queued, DP4 completes transmission and the data link goes idle. DP5 is parked during this idle interval because its expected transmit time exceeds the time remaining until VP1.6 is expected.

Figure 8:
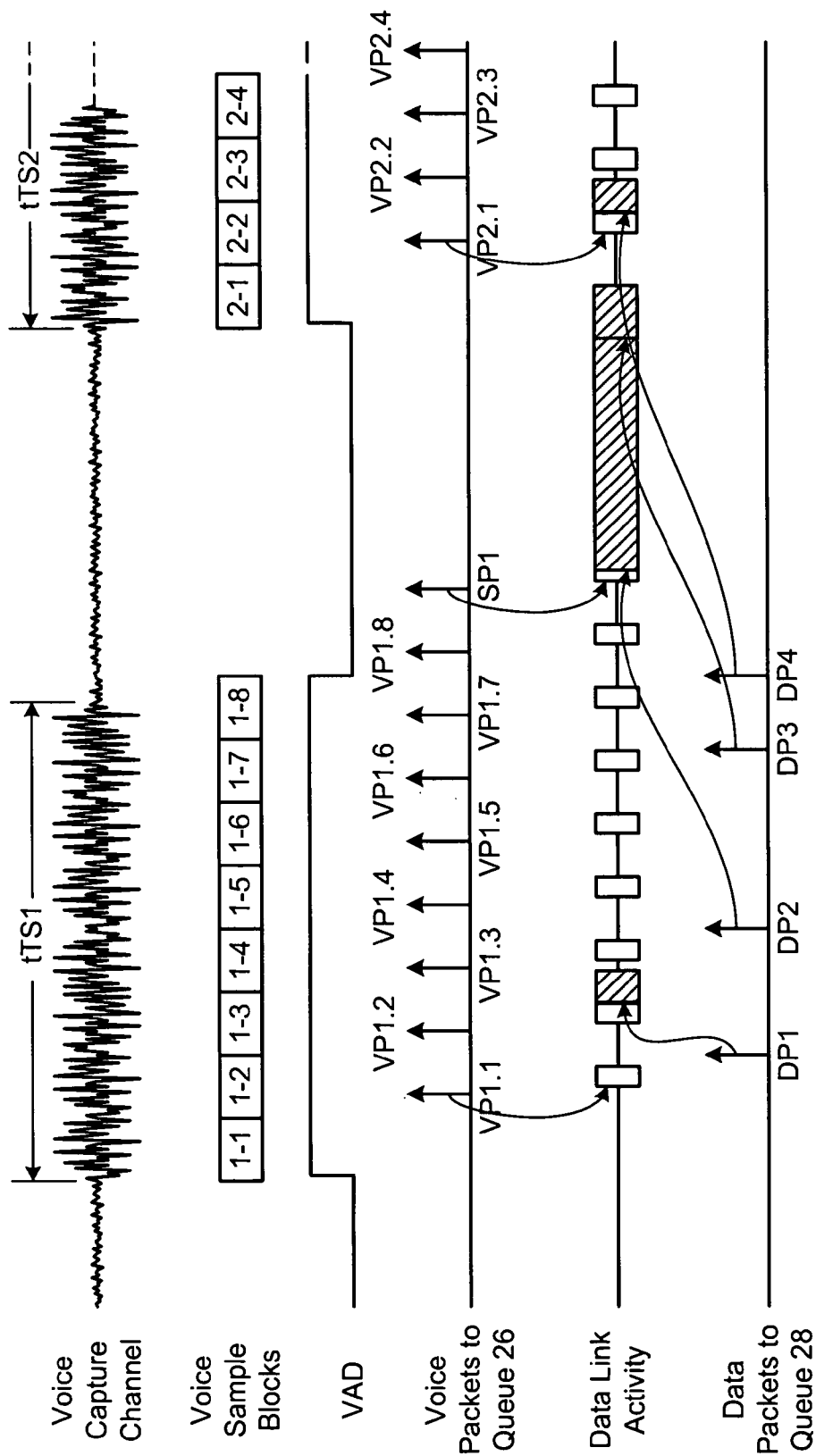

FIG. 8 illustrates a slightly different VP and DP queuing sequence, including a first talkspurt with a duration tTS1 and a second talkspurt with a duration tTS2, the two talkspurts separated by a speech pause. In FIG. 8, DP2 is a relatively long data packet, such that its expected transmit time occupies about three VP intervals.

Operation of an embodiment of the invention with this queuing sequence is as follows. DP1 is not queued far enough ahead of VP1.2 to be transmitted immediately, but it does fit into a VP interpacket interval. Thus DP1 is transmitted between VP1.2 and VP1.3. DP2 is queued in advance of VP1.4, but DP2 cannot fit into an interpacket interval. Thus DP2 remains parked until after SP1 is transmitted.

Both the voice activity detection signal VAD and silence packet SP1 serve as indicators that a silent interval in the speech pattern has been entered. It may not be known, at least initially, whether this silent interval is a speech pause, or a longer speech break. It is therefore initially assumed to be a speech pause. Within a speech pause, the next VP is no longer predicted to arrive at a one-interpacket interval spacing, but at the end of an expected speech pause interval.

In this embodiment, the length of the speech pause is statistically predicted from observed speech pause lengths. In FIG. 8, it is assumed that the predicted speech pause length exceeds the expected transmit time for DP2, so DP2 is transmitted after SP1. After DP2 is transmitted, the speech pause still has not ended, and so DP3 is also transmitted. If VAD had gone high before the decision to transmit DP3 were made, DP3 may still have been transmitted. This is because the expected speech pause length cannot go to zero before VAD goes high, and at that point, a finite time period remains before a VP (i.e., VP2.1) appears in the queue.

When a speech pause continues far past the range of expected speech pauses, it can be assumed to be a speech break. At the end of a speech break, longer delays can usually be tolerated, since the listener at the opposite end of the call should not sense any irregularity because of a small initial delay in the start of a new sentence. Thus once a speech break is declared, the system can act aggressively to transmit data packets until VAD once again goes high.

One problem with speech breaks is guessing when they begin and when they end. Several "expected speech pause" intervals may pass before the system can comfortably declare that a speech break has begun. And once begun, the system cannot reliably guess when the speech break will end. These problems can be partially alleviated with the use of incoming VAD.

Figure 9:
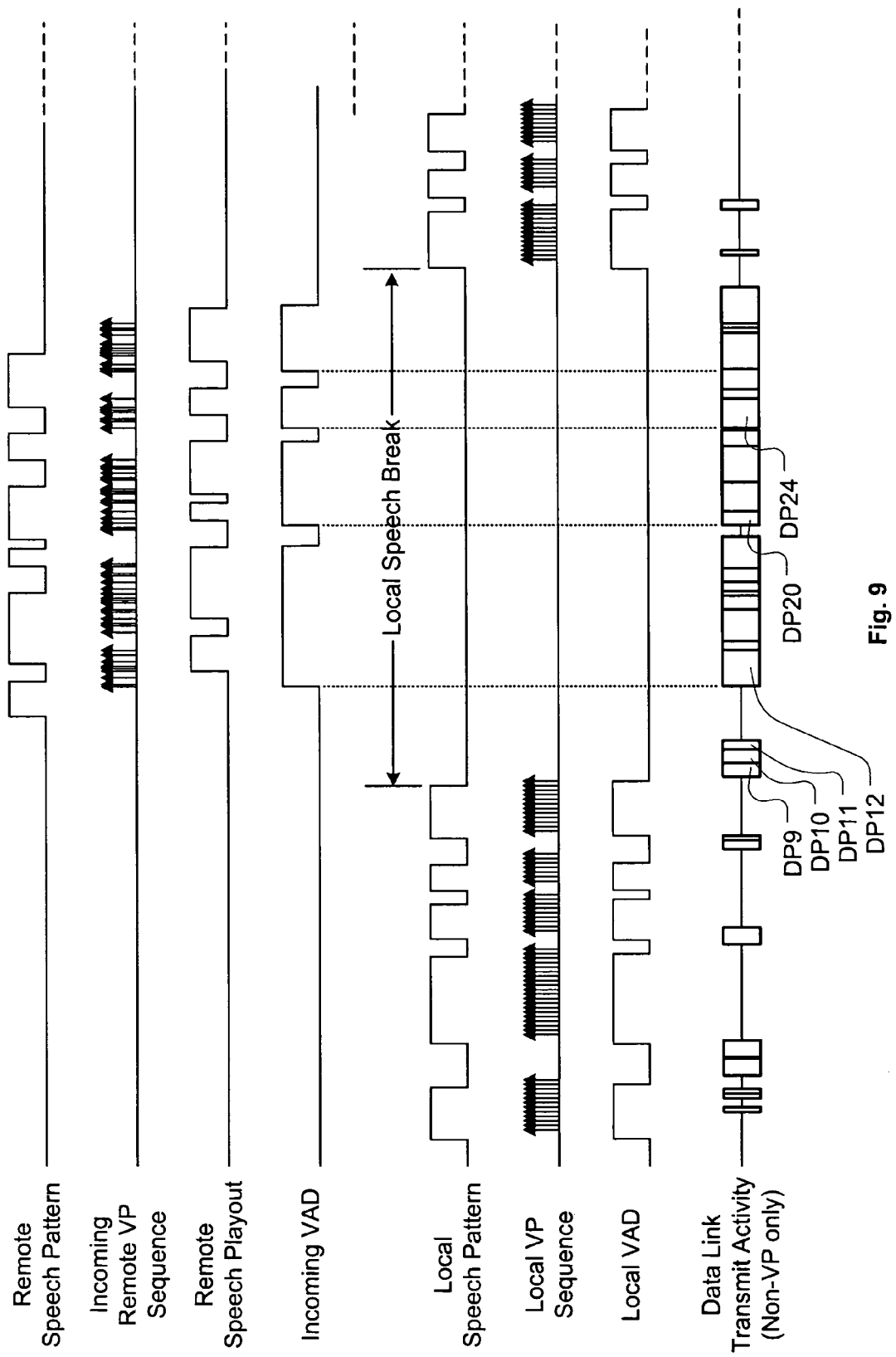

In most phone conversations, most of the time, both parties do not speak at once. Therefore, when the remote party is speaking and the local party is not, it is highly likely that a local speech break is occurring. And when the remote party ceases to speak, it becomes more likely that the local speech break will soon end. FIG. 9 illustrates how these principles can be used in a further embodiment of the invention.

In FIG. 9, a remote speech pattern exhibits energy during a local speech break. Note that before (and after) the local speech break, only a few data packets are getting transmitted because most of the data packets are relatively large compared to the interpacket interval. At the beginning of the local speech break, it is initially assumed that a speech pause is occurring. Thus a few data packets DP9-DP11 are sent, but the system then parks a relatively large packet DP12 while it waits for an expected speech resumption. But instead of an expected speech resumption, a remote VP sequence begins, triggering an incoming VAD signal. The system responds by declaring a local speech break and aggressively scheduling queued data packets.

The incoming VAD signal in this embodiment is a composite of two observations—when packets are received locally, and when those packets are actually played out. Thus the incoming VAD rises when the first remote VP arrives, but does not fall again until the jitter buffer empties (this is when the local listener actually hears the end of the remote utterance). Because of this composite method, short remote speech pauses (those shorter than the decode and playout delay) are not represented in the incoming VAD signal. Of course, in an alternate method either packet receipt or packet playout could be used alone to trigger an incoming VAD signal.

Each time the incoming VAD signal goes low, the local system may become more cautious under the assumption that the local speaker may soon end the local speech break. This is exhibited in FIG. 9 by the transmission breaks, coinciding with incoming VAD breaks, that precede DP20 and DP24. As illustrated, once incoming VAD goes high again the aggressive transmission of data packets resumes.

From the preceding discussion, it can be appreciated that at least three different operating modes can exist for a packet arrival prediction mechanism (PAPM) in an embodiment of the invention that processes voice packets. First, the interpacket interval operating mode is active during talkspurts, when voice packets are appearing at their highest possible frequency. Second, the speech pause operating mode is active during relatively short silence intervals. And third, the speech break operating mode is active during longer silence intervals. Depending on the types of observations available to the PAPM, transition between operating modes may be distinct and sudden, or may be gradual.

What information is available to the PAPM will usually depend on the level of integration between the PAPM and encoding/decoding components of the system. At one extreme, the PAPM may be relegated to discerning what is happening in the encoder and/or decoder from snooping packet headers as packets pass by. At the other end of the spectrum, the PAPM may be highly integrated with the encoder and/or decoder, even to the point of knowing—well in advance of a packet event—that that event will occur. Although the low-integration PAPM can be implemented in almost any packet data transmitting device, higher integration generally makes sense only at an encoding/decoding endpoint.

Figure 10:
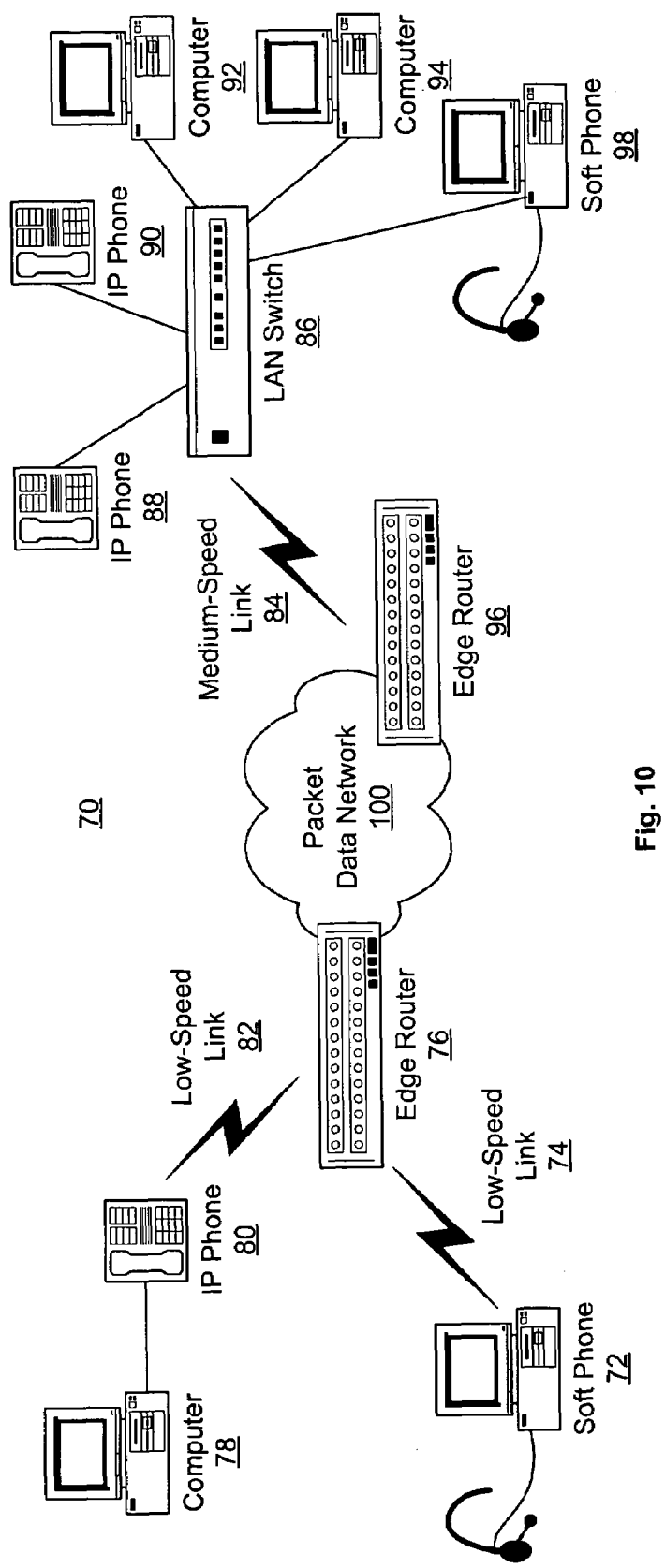
FIG. 10 illustrates one operational environment in which the present invention is useful.

FIG. 10 shows some elements of a VoIP operating environment 70. At the core of this environment is a packet data network 100. VoIP clients connect to the core network via data links to edge routers 76 and 96.

Some VoIP clients may connect to network 100 using a soft phone 72 and a low-speed link 74. A typical soft phone 72 uses a headset or (microphone/speakers) connected to a computer sound card for voice capture/presentation. Executable code running on the soft phone computer performs voice encoding/decoding and VP processing.

The low-speed link 74 can comprise, e.g., a PPP (Point-to-Point Protocol) data link running across a 56 k bit-per-second (or slower) analog modem connection, a DSL (digital subscriber line) or cable modem connection, an ISDN (Integrated Services Digital Network) BRI (Basic Rate Interface) connection, a wireless connection, etc. What is "low-speed" will generally depend on how often voice packets are generated (e.g., every 10 ms vs. every 60 ms), the VP data rate required during talkspurts, and the MTU for data packets. Thus if 8 kbps voice encoding must coexist with a data MTU of 512 octets, perhaps only an analog modem would be considered low-speed. On the other hand, if uncompressed 16-bit, 16 kHz stereo voice encoding must coexist with a data MTU of 9000 octets, even an ISDN PRI (Primary Rate Interface) may be considered low-speed.

An alternate VoIP client is IP phone 80. An IP phone has the look and feel of a regular phone, but transmits and receives voice packets instead of an analog phone signal. IP phone 80 connects through a low-speed link 82 to edge router 76 (an intermediate bridge may be required, not shown). IP phone 80 has a flow-through data port connected to computer 78, which allows computer 78 to send and receive data packets over the low-speed link as well.

Edge router 96 connects via a medium-speed link 84 to LAN switch 86. Switch 86 connects via high-speed physical links to multiple IP phones (88, 90) and multiple computers (92, 94, 98), one of which (98) is also equipped with a soft phone. Although link 84 may be more than adequate for VP/DP sharing without the invention when only a few VP sources are operating, when many operate simultaneously the configuration could still benefit from an embodiment of the invention.

In configuration 70, an embodiment of the invention could exist in several places. Soft phone 72 and IP phone 80 can both use an embodiment of the invention to decrease VP latency and jitter. Likewise, edge router 76 can use an embodiment of the invention on each port connected to data links 74 and 82 (or similar links) to decrease VP latency and jitter. And at least when multiple VP sources are competing for link 84, switch 86 and edge router 96 could benefit from an embodiment of the invention. An embodiment for each of these devices will now be described.

Figure 11:
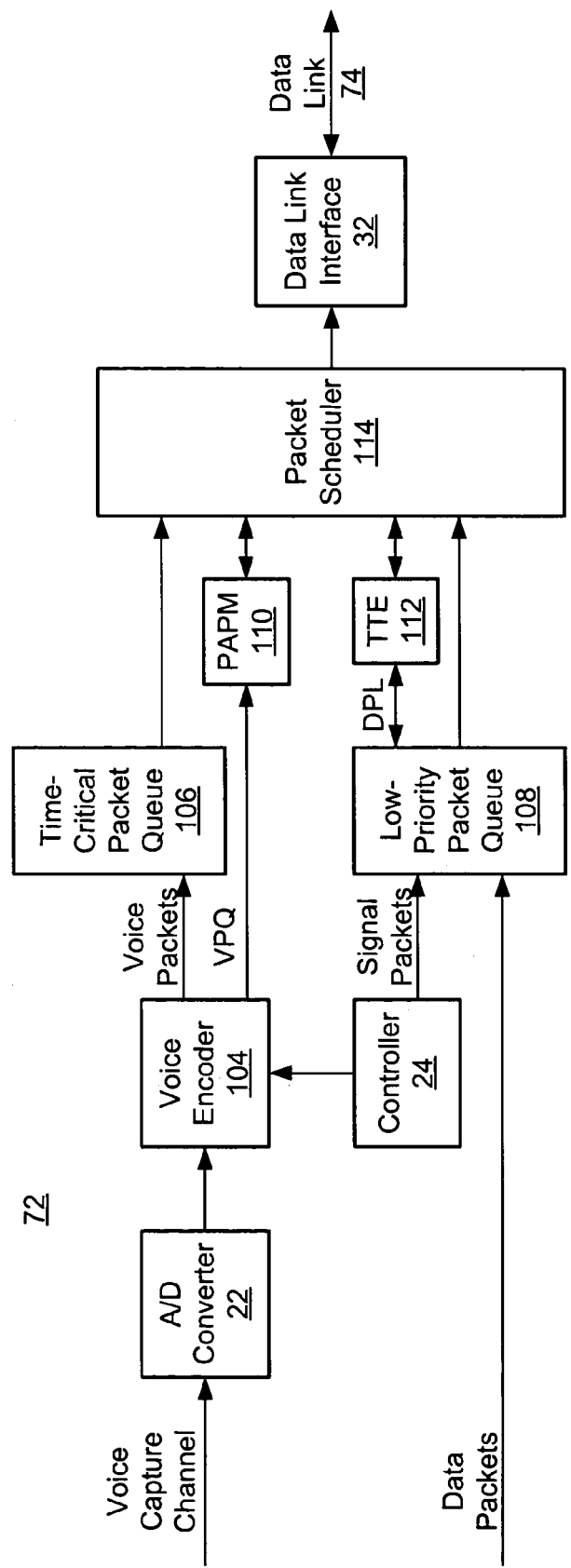
FIGS. 11, 12, 13, and 14 contain high-level block diagrams for some embodiments of the invention.

Consider first the high-level block diagram of a soft phone 72 shown in FIG. 11 (FIG. 11 is also applicable to IP phone 80). Packet scheduler 114 interleaves VPs from time-critical packet queue 106 with DPs from low-priority packet queue 108. Scheduler 114 communicates with PAPM 110, which provides the scheduler with VP arrival time estimates. Scheduler 114 also communicates with transmit time estimator (TTE) 112, which provides the scheduler with DP transmit time estimates.

PAPM 110 maintains statistics based on VP arrival times. In FIG. 11, voice encoder 104 sends PAPM 110 a signal VPQ for each VP that encoder 104 builds. Timing of VPQ is application-dependent, but may occur, e.g., when the first sample of the packet is received, when the last sample of the packet is received, when packet buildout begins, or when the packet is transmitted to queue 106. Additionally, but not shown, encoder 104 may inform PAPM 110 of its input sample rate, packet generation rate, nominal packet size, buildout delay, or other parameters that would help PAPM 110 to predict packet times. Note that with appropriate signaling between the encoder and the PAPM, at the beginning of and during talkspurts, the next packet "predicted" arrival time can be pinpointed with almost absolute certainty.

TTE 112 retrieves a data packet length (DPL) indication for the packet at the head of queue 108, e.g., by interpreting header information for that packet. TTE 112 may either scale the length by an expected data transfer rate for data link 74, or supply the length directly to scheduler 114. The expected data transfer rate can be obtained directly from data link interface 32, or in the alternative, calculated by observing transmit times for previously-transmitted packets.

Figure 12:
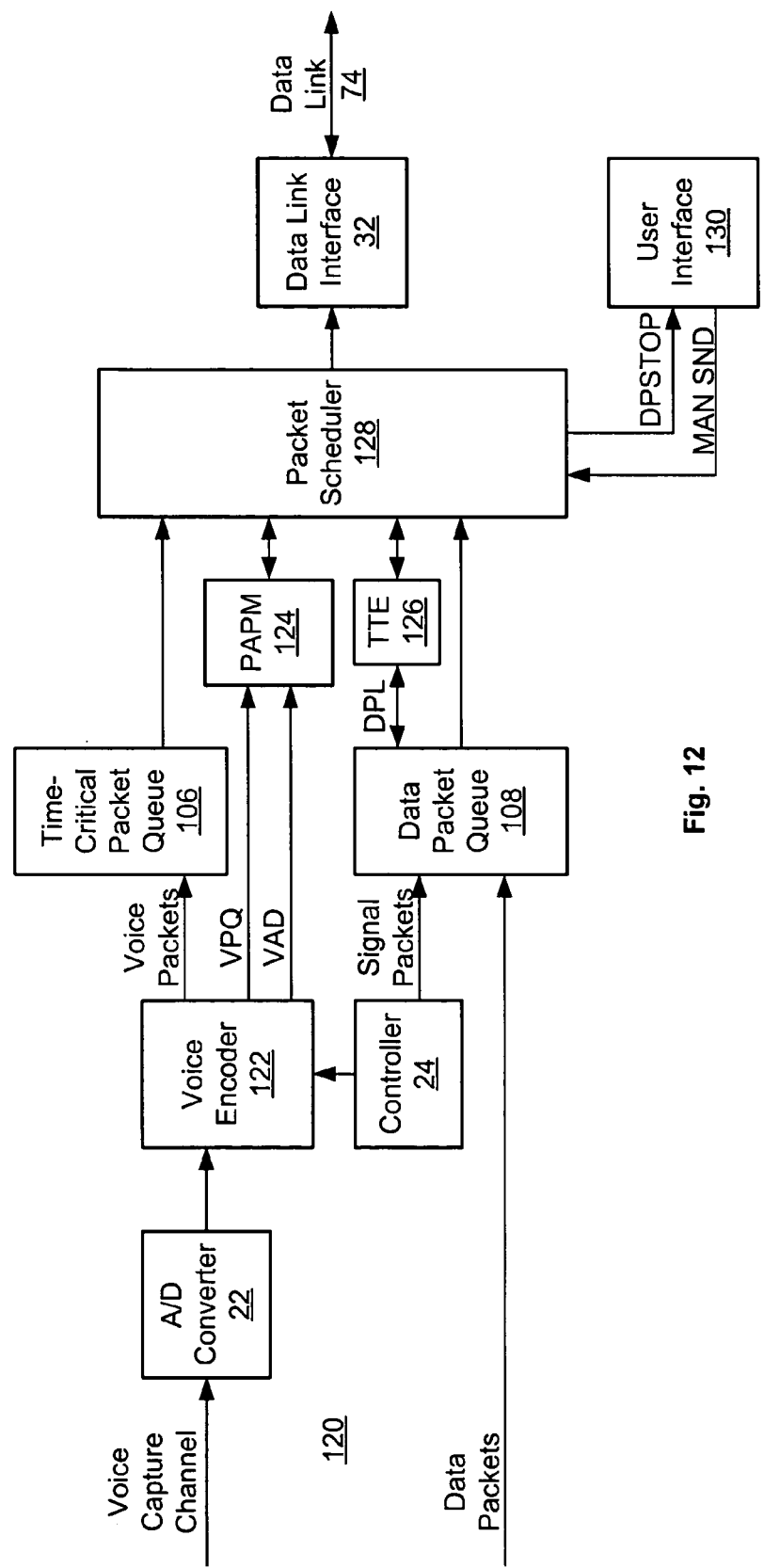

Several optional features for a soft phone or IP phone implementation 120 are shown in the high-level block diagram of FIG. 12. The first of these is a voice encoder 122 that uses VAD and supplies a VAD signal to PAPM 124. As shown in FIGS. 8 and 9, the VAD signal can aid the PAPM in locating the beginning and ending of silent intervals.

The second optional feature shown in FIG. 12 is a user interface 130. The user interface receives a signal DPSTOP from scheduler 128 whenever the scheduler has parked a packet at the head of queue 108 for an extended period of time. In one embodiment, the user is notified of the parked packet, and is given the opportunity to press a manual send button. The manual send button sends a signal MAN SND back to packet scheduler 128, which responds by sending the parked DP even if it causes delay to VPs. In other embodiments, the user interface can tabulate delay trends instead of responding to individual DPSTOP signals, and the user can respond with a signal that adjusts a system parameter, such as allowable jitter or data packet MTU.

Figure 13:
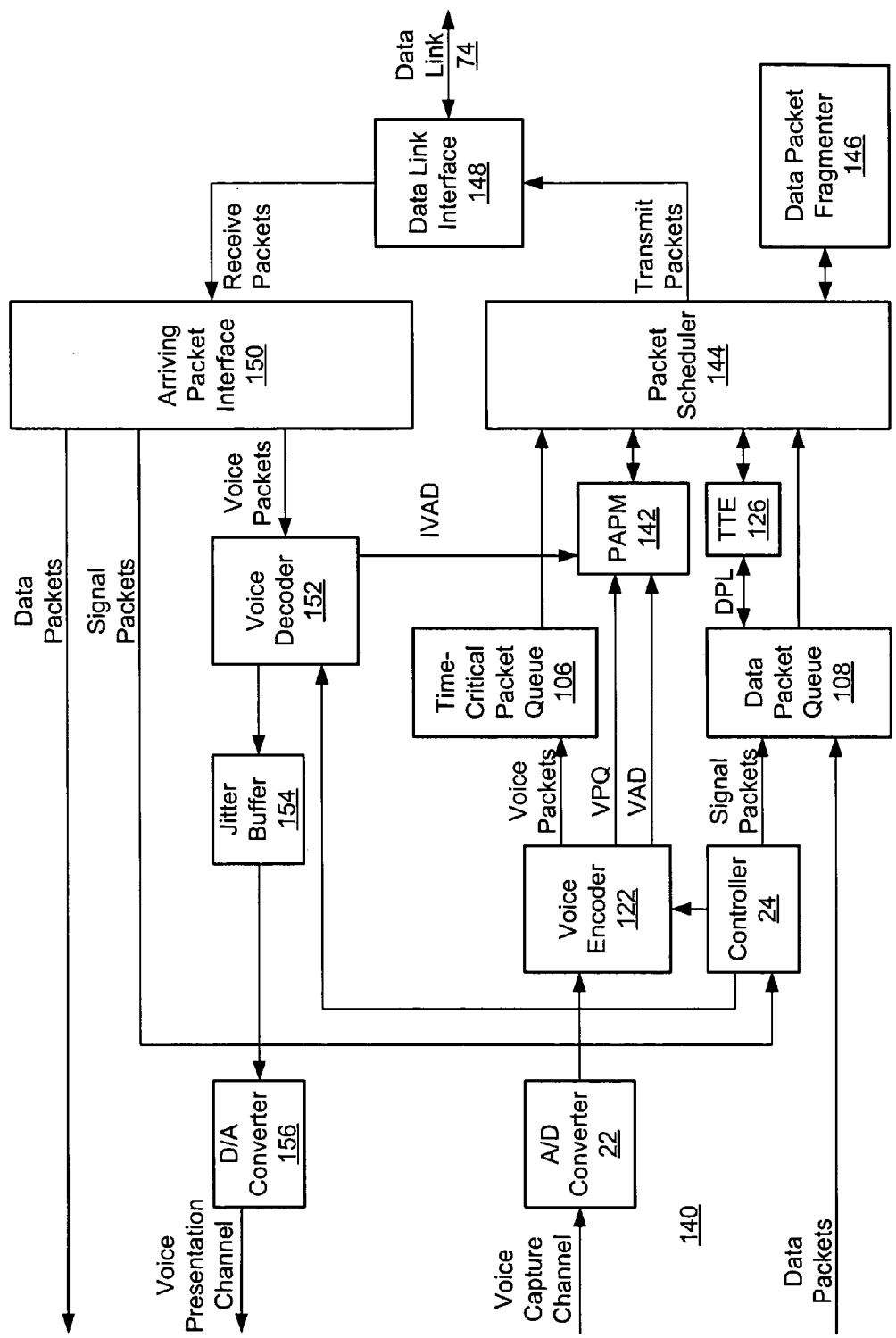

FIG. 13 shows a high-level block diagram for another embodiment 140 that can be implemented on a soft phone or IP phone. Receive packets are parsed by an arriving packet interface 150, which sends incoming VPs to voice decoder 152. Voice decoder 152 supplies an incoming VAD signal IVAD to PAPM 142. As shown in FIG. 9 and explained in the accompanying text, the IVAD signal can aid the PAPM in predicting the beginning and ending of speech breaks.

Also shown in FIG. 13 is an optional data packet fragmenter 146. When scheduler 144 is having difficulty scheduling a large DP for transmission, scheduler 144 may submit the packet to fragmenter 146 for fragmentation. The fragments are then placed at the head of queue 108 in place of the large DP.

Figure 14:
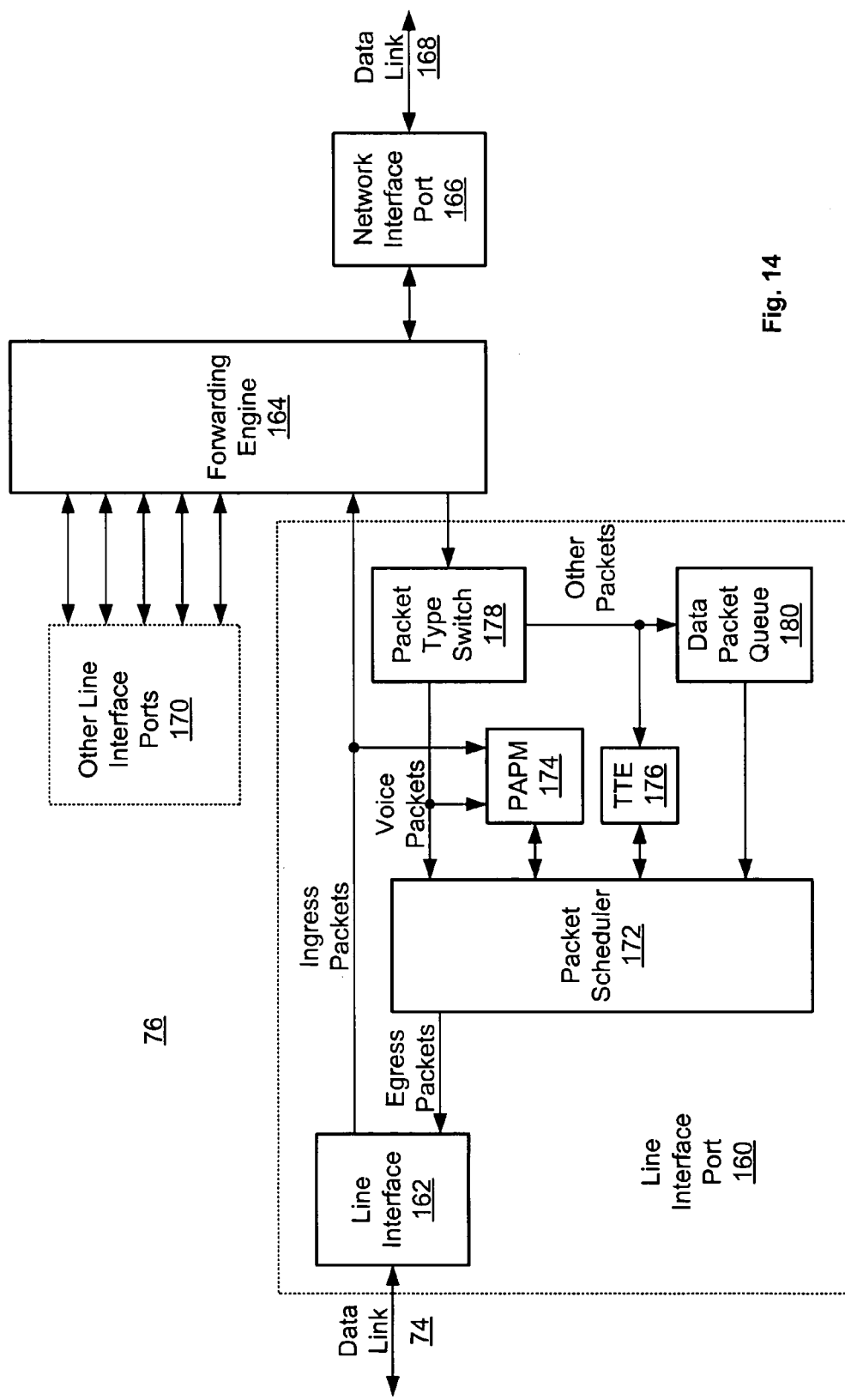

FIG. 14 shows a high-level block diagram for an edge router embodiment 76. The edge router has a network interface port 166 that connects edge router 76 with packet data network 100 via a high-speed data link 168. Edge router 76 also maintains multiple lower-speed data links, e.g., link 74, with remote devices. Each lower-speed link is assigned to a line interface port 160, 170.

Traffic flow in edge router 76 is mainly between each of the line interface ports and the network interface port. Forwarding engine 164 routes ingress packets (those received at a line interface port and bound for the packet data network) to network interface port 166. Forwarding engine 164 also routes egress packets (those received at network interface port 166 and bound for one of the line interface ports) to the appropriate line interface port.

Although edge router 76 is a high-speed device, at any particular line interface port packet transmission can be low-speed because of the data link. In fact, for VoIP across a low-speed data link, incoming voice latency and jitter due to data link 74, as observed at soft phone 72, can mirror outgoing voice latency and jitter due to the same link. In common scenarios where data downloads from the packet data network are much more significant than data uploads, prioritization of voice and data may be even more important in the edge router than in the soft phone.

In FIG. 14, edge router 76 has no direct communication with a voice encoder or decoder (direct communication could be done, in principle, using some sort of signaling packets). Thus in operation, it must infer the existence of time-sensitive traffic based on an examination of the traffic itself. Packet type switch 178 examines each packet distributed to line interface port 160 by forwarding engine 164. The type switch identifies a voice packet by the contents of the packet header, and sends the voice packet to packet scheduler 172. PAPM 174 also notes the arrival time of a voice packet.

Packet-type switch 178 sends all other packets to data packet queue 180. TTE 176 notes the packet size for packets placed in queue 180.

Scheduler 172 passes voice packets through to line interface 162 as quickly as possible. Scheduler 172 also supplies packets from data packet queue 180 to line interface 162 when this can be done without causing substantial delay to a voice packet that has not yet arrived, but that is predicted to arrive.

PAPM 174 maintains statistics on packet arrival, in a similar manner to the preceding embodiments. As shown, it can also note voice packets passing through in the ingress packet stream, to provide an IVAD-like capability. Several differences do exist, however, between the operation of PAPM 174 and that of the preceding embodiments. First, this embodiment works with no explicit VAD signals, no knowledge of the VoIP parameters used by the encoders, or any other pre-notification that a VP map be coming. Thus it may need to use more conservative predictions than an IP phone embodiment might use, resulting in more data packet parking. Second, because the egress packets have passed through the packet network, those egress packets that are also VPs will almost certainly not be jitter-free, and some packets may even have been dropped. Thus robust estimation techniques likely will be required.

One method of operating a PAPM based only on observed VP arrival times is with a filter. A simple filter, such as an alpha filter, can be used to compute a weighted average $\Delta T(i)$ for an arrival interval, given all VP arrival times up to the arrival of VP i, that weighs recently observed VP arrival times more heavily than earlier VP arrival times:

$$\Delta T(i) = (1-\alpha)\Delta T(i-1) + \alpha(T(i) - T(i-1)),$$

where $\alpha$ is a constant value between 0 and 1, and $T(i)$ is the arrival time of VP i. A second (non-linear) alpha filter can estimate the deviation $\sigma_{\Delta T}(i)$ in the arrival times:

$$\sigma_{\Delta T}(i) = (1-\alpha)\sigma_{\Delta T}(i-1) + \alpha|\Delta T(i-1) - (T(i) - T(i-1))|.$$

A more complex filter, such as a Kalman filter, can provide additional sophistication. A Kalman filter can provide appropriate weighting for measurements that arrive at irregular intervals, and can provide both an estimated state and an estimated state variance.

Kalman filters work well where two statistics can be quantified: process noise and measurement noise. Process noise quantifies, in essence, how much the true value of an estimated variable can be expected to drift over time. Measurement noise quantifies the random component of the measurements. These terms affect the weight that is afforded to each measurement received. The process noise causes the state variance to increase over time. The measurement noise causes the state variance to decrease with each measurement.

Figure 15:
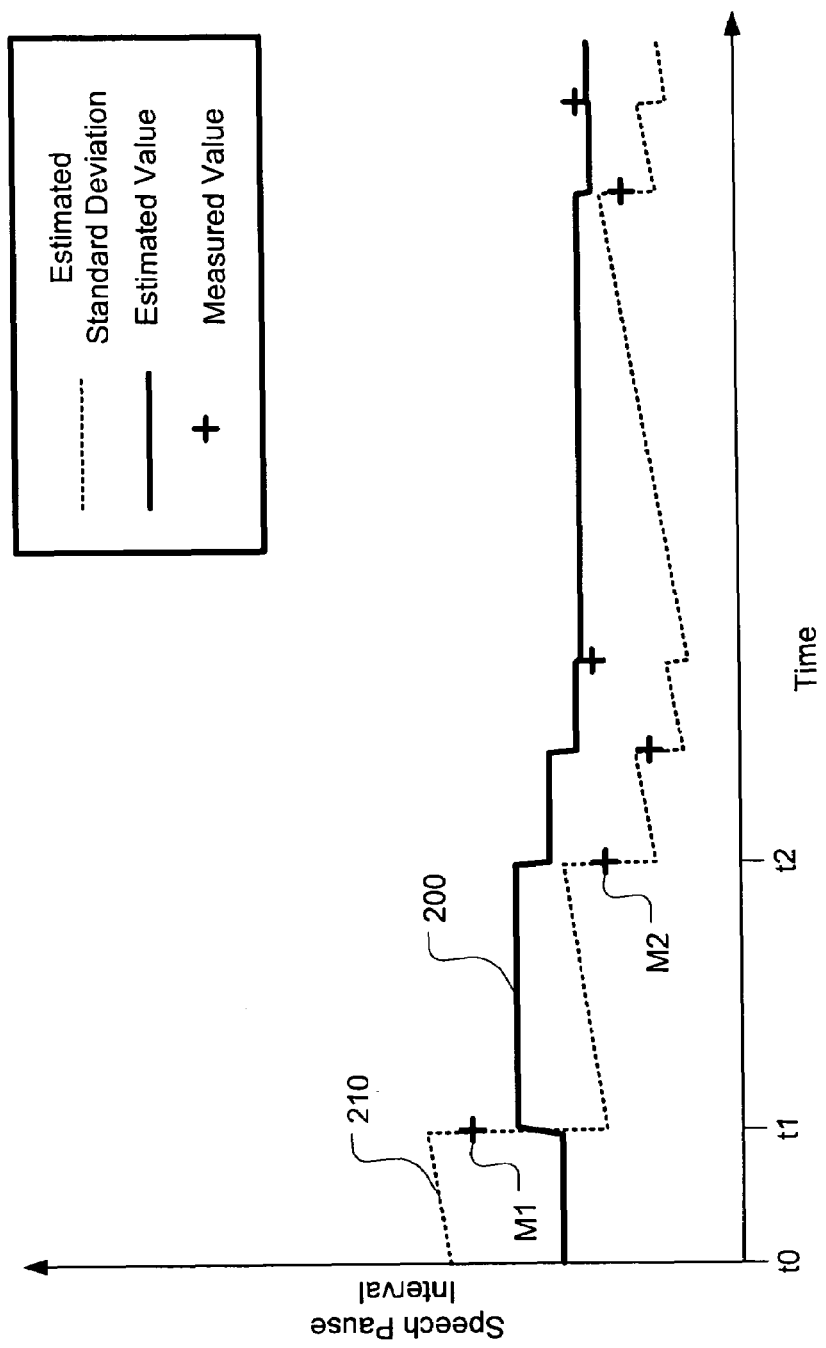
FIG. 15 contains a graph demonstrating one embodiment of filter updating for a packet arrival prediction mechanism.

FIG. 15 graphs one example for a "speech pause" Kalman filter state. At time t0, an estimate for the length of a speech pause interval (line 200) and an estimate for the standard deviation of the length (line 210) are assigned an initial value. Between t0 and t1, line 200 remains constant, but line 210 increases. This increase represents the increase in uncertainty for the expected value of a speech pause interval as time passes. At any point, a time update can be performed to update the filter states and variances to the current time.

At t1, a measurement is taken for an actual speech pause interval. The arrival of a measurement causes estimated standard deviation 210 to drop considerably. The measurement also causes the speech pause length 200 to change by a relatively large amount in the direction of the measurement.

Between t1 and t2, line 210 begins to increase again. At t2, a second measurement M2 arrives. This time, neither the decrease in standard deviation 210, nor the movement in speech pause length 200 are as dramatic, because the filter has a higher confidence in its estimate when M2 arrives. This pattern continues throughout the remainder of the graph.

The PAPM can use, e.g., a bank of three Kalman filters and operate in three different modes. In a talkspurt (TS) mode, a first Kalman filter K1 can maintain states for expected next-packet arrival time and interpacket interval during a talkspurt. In a speech pause (SP) mode, another Kalman filter K2 can maintain states for expected next-packet arrival time and speech pause interval between talkspurts. And with ingress VP observations, in a speech break (SB) mode, a third Kalman filter K3 can maintain states for expected next-packet arrival time and listen-to-talk turnaround time during speech breaks. Those skilled in digital filtering understand the basics of how a Kalman filter is implemented, and these details are therefore not repeated here.

Figure 16:
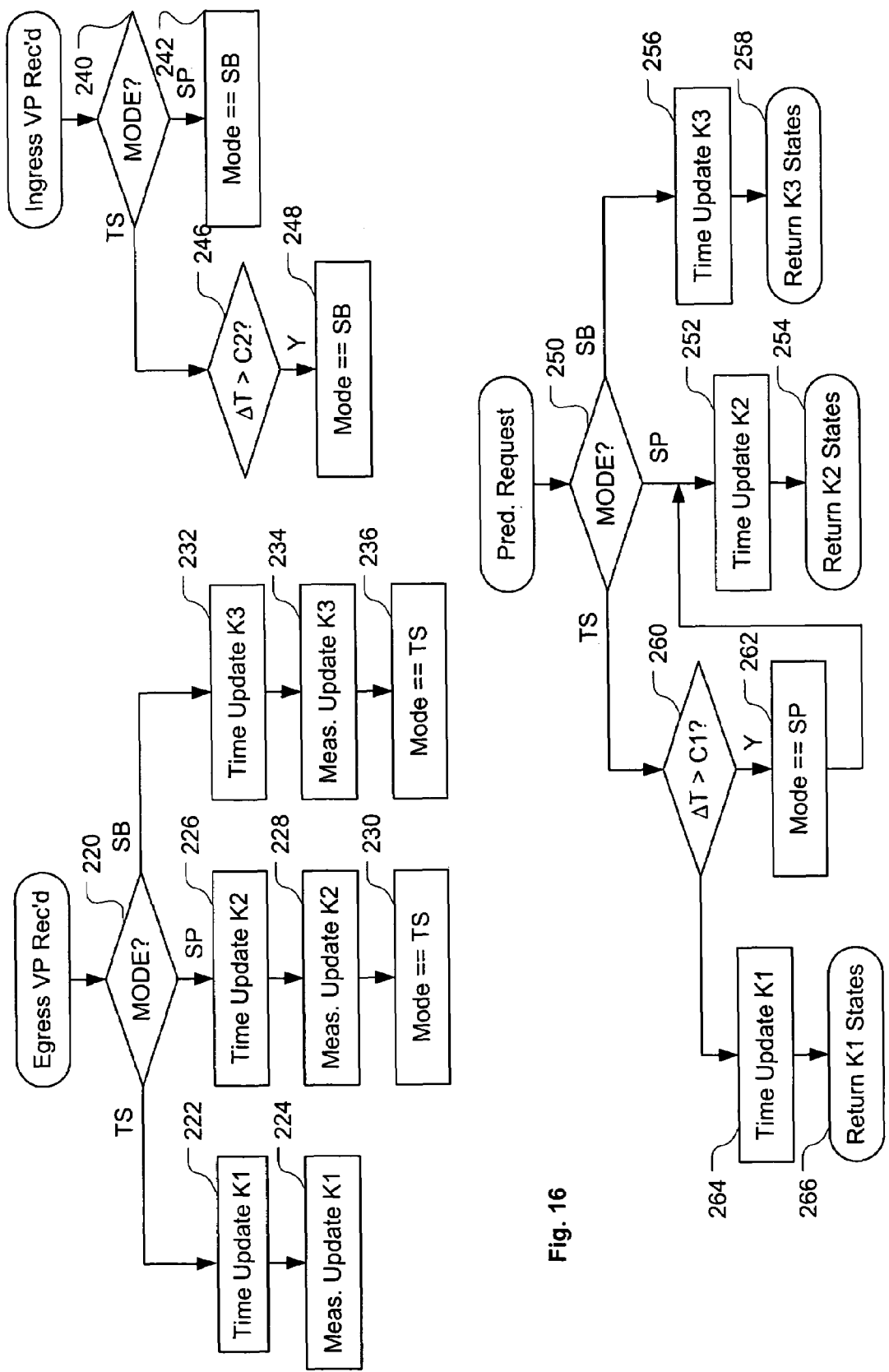
FIG. 16 depicts a flowchart illustrating one method of operation for a packet arrival prediction mechanism.

For this three-mode example, FIG. 16 flowcharts how the PAPM switches modes and performs state updates. Three events can trigger PAPM activity: the arrival of an egress VP, the arrival of an ingress VP, and a request from the packet scheduler for a packet arrival prediction. FIG. 16 contains a flowchart for each of these events.

When an egress VP arrives, a mode switch 220 is performed. If the mode is TS, the VP provides a new measurement of the interpacket interval. Thus a time update 222 and a measurement update 224 of filter K1 are performed using the arrival time of the egress VP as a measurement. If the mode is SP, the arrival of a VP signifies the end of a speech pause interval. Thus a time update 222 and a measurement update 224 of filter K2 are performed. But the VP also signals the beginning of a new talkspurt, so the mode is switched to TS at block 230. If the mode is SB, the arrival of a VP signifies the end of a speech break interval. Using the measured difference between the arrival time of the last ingress VP and the arrival time of the egress VP, a time update 232 and a measurement update 234 of filter K3 are performed. But the VP also signals the beginning of a new talkspurt, so the mode is switched to TS at block 236.

When an ingress VP arrives, this could indicate that a speech break is in progress. A mode switch 240 is performed, but if the mode is already SB, the arrival of an ingress VP requires no action. If the mode is SP, the arrival of an ingress VP changes the speech pause to a speech break (block 242). If the mode is TS, the arrival of an ingress VP might cause a mode change to SB (block 248). But this mode change only occurs if the time since the last arrival of a VP (time $\Delta T$) exceeds a parameter C2, which may be, e.g., some multiple of the TS interpacket interval. Otherwise, both parties may be talking at once, and the mode should remain TS.

When the scheduler requests a packet arrival prediction, filter states are returned according to the current mode. A mode switch 250 determines which processing path will be taken. In SP mode, a time update 252 is performed to bring filter K2 current, and then the K2 states are returned at block 254. In SB mode, a time update 256 is performed to bring filter K3 current, and then the K3 states are returned at block 258. And in TS mode, one of two things will happen, depending on the outcome of decision block 260. When the time since the last arrival of a VP (time $\Delta T$) exceeds a parameter C1, which may be, e.g., some multiple of the TS interpacket interval, the mode is switched to SP (block 262) and the SP processing branch is executed. Otherwise, a time update 264 is performed to bring filter K1 current, and then the K1 states are returned at block 266.

The scheduler uses the PAPM states to decide whether a waiting DP can be completely transmitted without causing substantial delay to an as-yet-to-arrive VP. One general method is to compute, within the scheduler (or the PAPM), a time estimate $t_R$ that expresses the "no substantial delay" time that must be met by DP transmission, if that transmission is to be allowed. The time estimate can use an equation such as:

$$t_R = t_{NP} + k_o \sigma_{NP} + j_A - t_C,$$

where $t_{NP}$ is the expected arrival time Kalman filter state for the next VP, $\sigma_{NP}$ is the corresponding Kalman filter standard deviation estimate, $k_o$ is a standard deviation multiplier, $j_A$ is an allowable jitter, and $t_C$ is the current time. Note that if $k_o$ is negative, the scheduler is biased towards not delaying VPs arriving some time earlier than expected, where if $k_o$ is positive, the scheduler is biased towards not delaying VPs only if they arrive some time later than expected. The allowable jitter $j_A$ is an additional term that expresses a jitter budget for the current link. Of course, $j_A$ and/or $k_o$ can be set to zero.

Once $t_R$ has been calculated, it can be compared to the expected transmit time for the waiting DP. If $t_R$ is larger, the DP is sent. Otherwise the DP is parked.

An illustration of an embodiment for switch 86 (FIG. 10) has not been presented, as it is generally similar to the edge router embodiment. But several significant differences exist. First, the potential bottleneck in the switch is the connection to the edge router. Thus, at the bottleneck, multiple time-critical streams are multiplexed. Each stream could thus be predicted and queued separately, while multiple lower-priority data streams are queued together. The scheduler could also attempt to arrange scheduling for multiple time-critical streams (i.e. by inserting a small constant delay in one stream) so that two (or more) time-critical packets are transmitted consecutively, thus leaving a larger interpacket interval for the transmission of data.

The preceding embodiments have concentrated on implementations for voice packet transmission. Similar principles can be used to build implementations for video conferencing, interactive gaming, etc., and can depend on the data flow characteristics for those time-critical packet applications. For instance, for a video system that transmits I (independent) frames, P (predicted) frames, and B (bi-directionally-predicted) frames in a predictable pattern, it is known that: 1) I frames generally require higher bandwidth; 2) a P frame depends from a previous I or P frame; and 3) a B frame depends from both a previous and a following I or P frame. Given this knowledge, data frames could be allowed to interfere more or less with video packet transmission depending on the type of frame that is currently being sent.

Although several embodiments of the invention and implementation options have been presented, one of ordinary skill will recognize that the concepts described herein can be used to construct many alternative implementations. Such implementation details are intended to fall within the scope of the claims. For example, although alpha filters and Kalman filters have been described for predicting packet arrival statistics, other known filtering and statistical approaches can also be used, such as median filters, least-squares estimation, or histogram-based approaches. It is recognized that the longer a silent interval continues, the harder it is for a listener to detect a significant delay when speech resumes—thus some embodiments may allow larger and larger DPs to be interleaved as the length of a silent interval grows. "Queuing" need not involve any special-purpose memory; DP and VP queues may share the same physical memory, and no physical movement of packet contents within memory may occur at all between an encoder and the data link interface. For instance, pointers to packet header and payload memory addresses may be used to "pass" packets between the various blocks shown in the figures. In an edge router or a switch, a packet type switch could be located elsewhere, such as in the forwarding engine.

The system is also not limited to a single time-sensitive-packet queue and a single lower-priority-packet queue. For instance, applications that agree to conform to a smaller MTU can have their packets placed in a different lower-priority queue than applications that might submit larger packets. The overall bandwidth between the two lower-priority queues could still be allocated fairly, but the smaller-MTU queue may be able to place packets between VPs when the larger-MTU queue cannot.

Particular device embodiments, or subassemblies of an embodiment, can be implemented in hardware. All device embodiments can be implemented using a microprocessor executing computer instructions. Thus another claimed aspect of the invention is an apparatus comprising a computer-readable medium containing computer instructions that, when executed, cause one or more processors to execute a method according to the invention.

The network could take many forms, including cabled telephone networks, wide-area or local-area packet data networks, wireless networks, cabled entertainment delivery networks, or several of these networks bridged together. Different networks may be used to reach different endpoints.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of interleaving the transmission of time-critical packets with the transmission of lower-priority packets across a common data link, the method comprising:
   maintaining time-critical packet arrival statistics;
   when a lower-priority packet becomes available for transmission across the data link, estimating a transmit time required for transmission of that packet; and
   based on the time-critical packet arrival statistics and the estimated transmit time for the lower-priority packet, predicting whether the lower-priority packet can be selected for transmission across the data link without causing substantial delay to a time-critical packet that is not yet available for transmission across the data link, wherein predicting whether the lower-priority packet can be selected for transmission without causing substantial delay comprises computing time remaining until an expected arrival of the next time-critical packet and comparing the time remaining with an estimated transmit time for the lower-priority packet.

2. The method of claim 1, wherein maintaining time-critical-packet arrival statistics comprises measuring the time of arrival for previously-received time-critical packets, and using the measured time of arrival for those packets to update an estimate of the expected time of arrival for the next time-critical packet.

3. The method of claim 2, wherein updating an estimate comprises updating a filter state using the measured time of arrival.

4. The method of claim 1, wherein when the time-critical packets comprise voice packets, maintaining time-critical-packet arrival statistics comprises measuring a speech pause interval between adjacent voice talkspurts using packet measured time of arrival, and maintaining statistics on the duration of speech pause intervals.

5. The method of claim 1, wherein, during a bi-directional packet voice conference, maintaining time-critical-packet arrival statistics comprises measuring a turnaround interval between the beginning of a silence interval for incoming voice conference packets and the beginning of a talkspurt for outgoing time-critical packets, and maintaining statistics on the duration of the turnaround interval.

6. The method of claim 1, wherein maintaining time-critical-packet arrival statistics further comprises measuring the time between a time-critical packet's time of arrival and that same packet's end-of-transmission time.

7. The method of claim 1, further comprising placing lower-priority packets in a lower-priority queue in the order received, wherein a lower-priority packet becomes available for transmission when it reaches the head of the queue.

8. The method of claim 1, wherein estimating the transmit time for a lower-priority packet comprises determining the packet's length and scaling that length by an estimated data link rate expressed in units of data divided by units of time.

9. The method of claim 1, wherein transmission does not cause substantial delay if the estimated transmit time for the lower-priority packet does not exceed the time remaining until the expected arrival of the next time-critical packet by more than an allowable jitter.

10. The method of claim 1, wherein computing the time remaining until the expected arrival of the next time-critical packet comprises computing a time estimate $t_R = t_{NP} + k_\sigma \sigma_{NP} + j_A - t_C$, where $t_{NP}$ is an expected arrival time estimate for the next time-critical packet, $\sigma_{NP}$ is an arrival time standard deviation for the next time-critical packet, $k_\sigma$ is a standard deviation multiplier, $j_A$ is an allowable jitter, and $t_C$ is the current time.

11. The method of claim 1, wherein computing the time remaining until the expected arrival of the next time-critical packet comprises receiving a pre-notification from an encoder that a time-critical packet is being built.

12. The method of claim 1, wherein computing the time remaining until the expected arrival of the next time-critical packet comprises receiving a pre-notification from a voice activity detector when voice activity begins and ceases.

13. The method of claim 1, further comprising, when a time-critical packet becomes available for transmission across the data link, transmitting that packet as soon as the data link is available.

14. An apparatus comprising a computer-readable medium containing computer instructions that, when executed, cause a processor or multiple communicating processors to interleave transmissions of time-critical packets with transmissions of lower-priority packets across a common data link, the interleaving comprising:
   maintaining time-critical packet arrival statistics;
   when a lower-priority packet becomes available for transmission across the data link, estimating the transmit time required for transmission of that packet; and
   based on the time-critical packet arrival statistics and the estimated transmit time for the lower-priority packet, predicting whether the lower-priority packet can be selected for transmission across the data link without causing substantial delay to a time-critical packet that is not yet available for transmission across the data link, wherein predicting whether the lower-priority packet can be selected for transmission without causing substantial delay comprises computing a time remaining until an expected arrival of the next time-critical packet and comparing the time remaining with an estimated transmit time for the lower-priority packet.

15. The apparatus of claim 14, wherein maintaining time-critical-packet arrival statistics comprises measuring the time of arrival for previously-received time-critical packets, and using the measured time of arrival for those packets to update an estimate of the expected time of arrival for the next time-critical packet.

16. The apparatus of claim 15, wherein updating an estimate comprises updating a filter state using the measured time of arrival.

17. The apparatus of claim 14, wherein when the time-critical packets comprise voice packets, maintaining time-critical-packet arrival statistics comprises measuring a speech pause interval between adjacent voice talkspurts using packet measured time of arrival, and maintaining statistics on the duration of speech pause intervals.

18. The apparatus of claim 14, wherein, during a bi-directional packet voice conference, maintaining time-critical-packet arrival statistics comprises measuring a turnaround interval between the beginning of a silence interval for incoming voice conference packets and the beginning of a talkspurt for outgoing time-critical packets, and maintaining statistics on the duration of the turnaround interval.

19. The apparatus of claim 14, further comprising placing lower-priority packets in a lower-priority queue in the order received, wherein a lower-priority packet becomes available for transmission when it reaches the head of the queue.

20. The apparatus of claim 14, wherein transmission does not cause substantial delay if the estimated transmit time for the lower-priority packet does not exceed the time remaining until the expected arrival of the next time-critical packet by more than an allowable jitter.

21. The apparatus of claim 14, wherein computing the time remaining until the expected arrival of the next time-critical packet comprises computing a time estimate $t_R = t_{NP} + k_o \sigma_{NP} + j_A - t_C$, where $t_{NP}$ is an expected arrival time estimate for the next time-critical packet, $\sigma_{NP}$ is an arrival time standard deviation for the next time-critical packet, $k_o$ is a standard deviation multiplier, $j_A$ is an allowable jitter, and $t_C$ is the current time.

22. The apparatus of claim 14, wherein computing the time remaining until the expected arrival of the next time-critical packet comprises receiving a pre-notification from an encoder that a time-critical packet is being built.

23. The apparatus of claim 14, wherein computing the time remaining until the expected arrival of the next time-critical packet comprises receiving a pre-notification from a voice activity detector when voice activity begins and ceases.

24. The apparatus of claim 14, further comprising, when a time-critical packet becomes available for transmission across the data link, transmitting that packet as soon as the data link is available.

25. A system comprising:
means for maintaining time-critical packet arrival statistics;
means for estimating a transmit time required for transmission of a lower-priority packet when the lower-priority packet becomes available for transmission across a data link; and
means for predicting whether the lower-priority packet can be selected for transmission across the data link without causing substantial delay to a time-critical packet that is not yet available for transmission across the data link based on the time-critical packet arrival statistics and the estimated transmit time for the lower-priority packet, wherein the means for predicting whether the lower-priority packet can be selected for transmission without causing substantial delay comprises means for computing time remaining until an expected arrival of the next time-critical packet and means for comparing the time remaining with an estimated transmit time for the lower-priority packet.

26. The system of claim 25, wherein transmission does not cause substantial delay if the estimated transmit time for the lower-priority packet does not exceed the time remaining until the expected arrival of the next time-critical packet by more than an allowable jitter.

27. The system of claim 25, wherein the means for computing the time remaining until the expected arrival of the next time-critical packet comprises means for computing a time estimate $t_R = t_{NP} + k_o \sigma_{NP} + j_A - t_C$, where $t_{NP}$ is an expected arrival time estimate for the next time-critical packet, $\sigma_{NP}$ is an arrival time standard deviation for the next time-critical packet, $k_o$ is a standard deviation multiplier, $j_A$ is an allowable jitter, and $t_C$ is the current time.

28. The system of claim 25, wherein the means for computing the time remaining until the expected arrival of the next time-critical packet comprises means for receiving a pre-notification from an encoder that a time-critical packet is being built.

29. The system of claim 25, wherein the means for computing the time remaining until the expected arrival of the next time-critical packet comprises means for receiving a pre-notification from a voice activity detector when voice activity begins and ceases.

* * * * *